(12) United States Patent
Van Der Burg et al.

(10) Patent No.: US 10,780,399 B2
(45) Date of Patent: Sep. 22, 2020

(54) MEMBRANE STACK AND METHOD FOR MAKING THE SAME

(71) Applicant: Fujifilm Manufacturing Europe B.V., Tilburg (NL)

(72) Inventors: Eduard Van Der Burg, Tilburg (NL); Gerardus Linders, Tilburg (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 176 days.

(21) Appl. No.: 15/778,460

(22) PCT Filed: Nov. 17, 2016

(86) PCT No.: PCT/GB2016/053584
§ 371 (c)(1),
(2) Date: May 23, 2018

(87) PCT Pub. No.: WO2017/089747
PCT Pub. Date: Jun. 1, 2017

(65) Prior Publication Data
US 2018/0353909 A1    Dec. 13, 2018

(30) Foreign Application Priority Data
Nov. 26, 2015 (GB) .................................. 1520869.7

(51) Int. Cl.
*B01D 63/08* (2006.01)
*B01D 61/46* (2006.01)
(Continued)

(52) U.S. Cl.
CPC ............ *B01D 63/082* (2013.01); *B01D 25/26* (2013.01); *B01D 61/46* (2013.01); *B01D 61/50* (2013.01);
(Continued)

(58) Field of Classification Search
CPC .... B01D 63/082; B01D 63/081; B01D 61/46; B01D 61/50; B01D 61/28; B01D 25/26;
(Continued)

(56) References Cited

U.S. PATENT DOCUMENTS

| 2,799,644 A * | 7/1957 | Kollsman ............... B01D 61/50 204/636 |
| 4,430,218 A | 2/1984 | Perl et al. |
| 9,782,725 B2 | 10/2017 | Liang et al. |
| 2005/0173330 A1 | 8/2005 | Osenar et al. |

(Continued)

FOREIGN PATENT DOCUMENTS

| DE | 3127548 A1 | 4/1982 |
| DE | 3341262 A1 | 5/1985 |

(Continued)

*Primary Examiner* — Liam Royce
(74) *Attorney, Agent, or Firm* — Banner & Witcoff, Ltd.

(57) ABSTRACT

Membrane cell stack arrangement and method of manufacturing such a membrane cell stack arrangement. The arrangement has a housing (2) having a central axis, and a stack of membrane cells (4), each membrane cell (6) being arranged inside the housing (2) with a major surface (6a) of the membrane cell (6) oriented substantially perpendicular to the central axis. Each membrane cell (6) has a corner recess (12) between each two adjacent sides of at least four sides (10a-d). Sealing compartments (14) are provided by corner recesses (12) of adjacent membrane cells of the stack of membrane cells (4) in co-operation with a part of an inner surface (2a) of the housing (2).

26 Claims, 5 Drawing Sheets

(51) Int. Cl.
  *B01D 25/26* (2006.01)
  *B01D 61/50* (2006.01)
  *B01D 65/00* (2006.01)
  *B01D 61/28* (2006.01)

(52) U.S. Cl.
  CPC ......... *B01D 63/081* (2013.01); *B01D 65/003* (2013.01); *B01D 61/28* (2013.01); *B01D 2201/60* (2013.01); *B01D 2201/605* (2013.01); *B01D 2311/2615* (2013.01); *B01D 2313/04* (2013.01)

(58) Field of Classification Search
  CPC ............ B01D 65/003; B01D 2201/605; B01D 2201/60; B01D 2311/2615; B01D 2313/04
  See application file for complete search history.

(56) References Cited

U.S. PATENT DOCUMENTS

| | | | |
|---|---|---|---|
| 2010/0326833 A1* | 12/2010 | Messalem | B01D 61/50 204/632 |
| 2012/0117789 A1* | 5/2012 | Liang | B01D 61/48 29/592.1 |
| 2015/0180059 A1 | 6/2015 | Vanderwees et al. | |
| 2016/0009573 A1 | 1/2016 | Liang | |

FOREIGN PATENT DOCUMENTS

| | | |
|---|---|---|
| GB | 1292952 A | 10/1972 |
| JP | H08323159 A | 12/1996 |
| WO | 2007/096128 A1 | 8/2007 |
| WO | 2012/065016 A1 | 5/2012 |
| WO | 2014/142944 A1 | 9/2014 |
| WO | 2015/153885 A1 | 10/2015 |

* cited by examiner

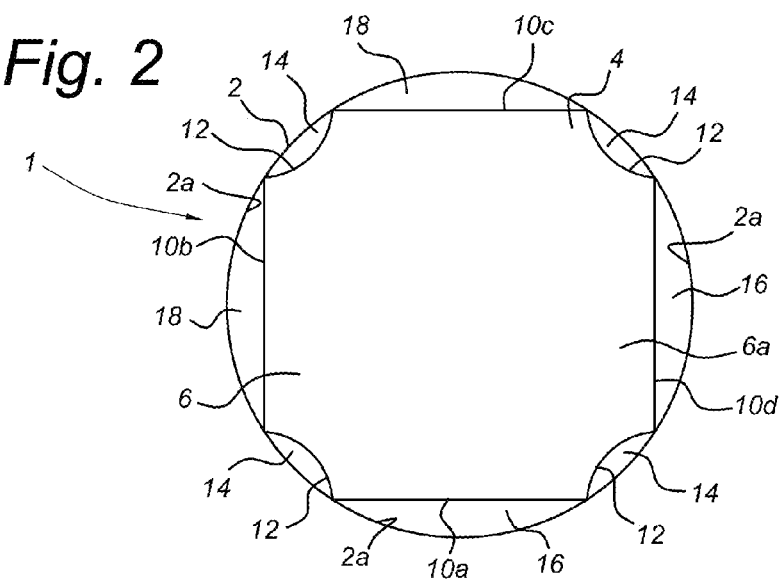
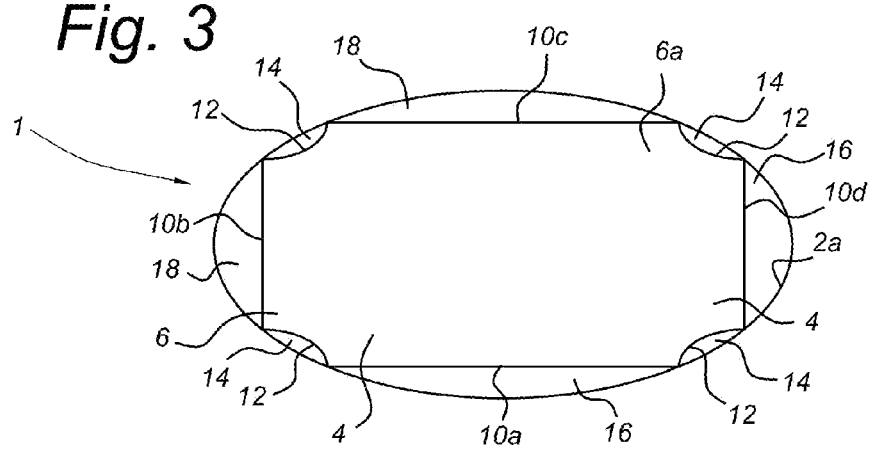
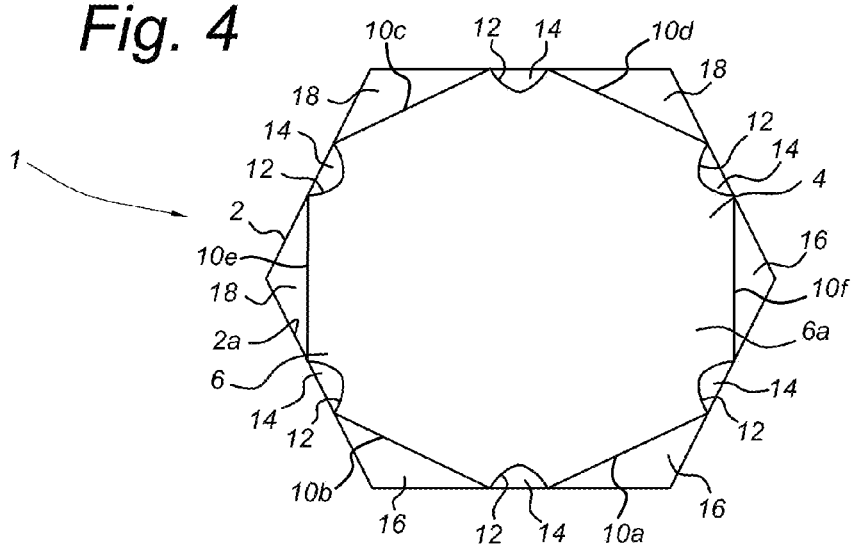

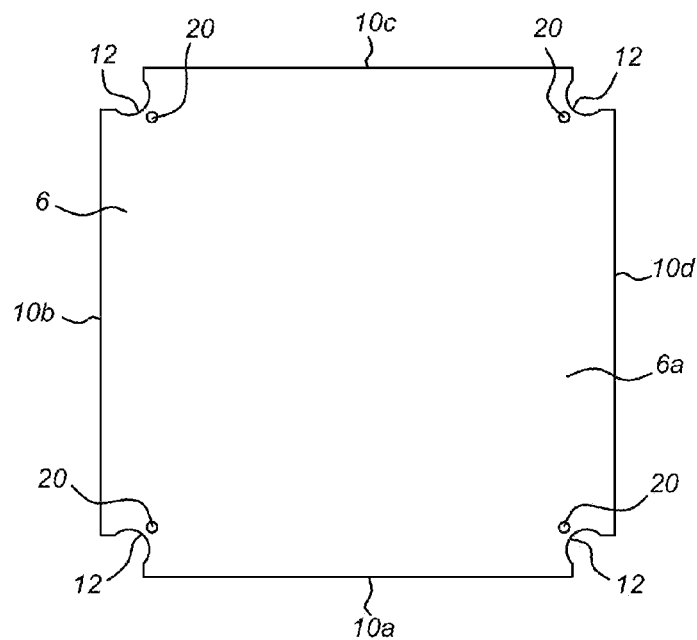
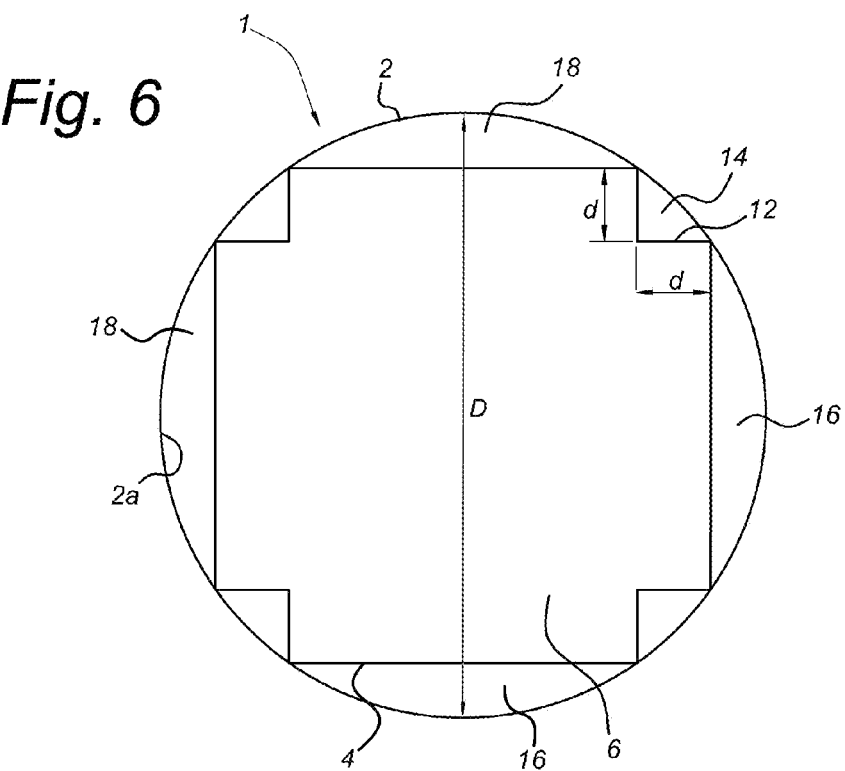

Fig. 7
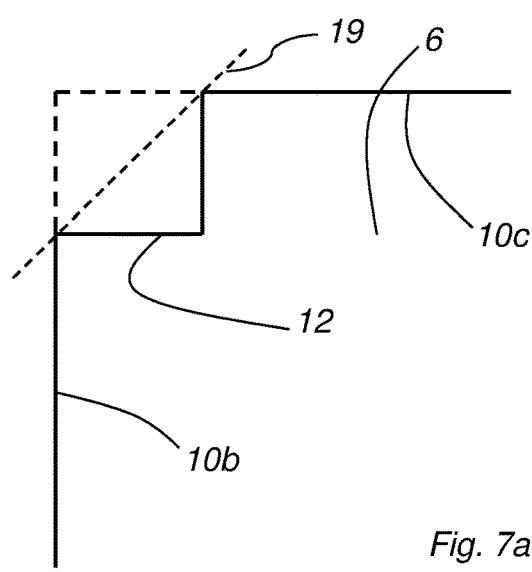
Fig. 7a
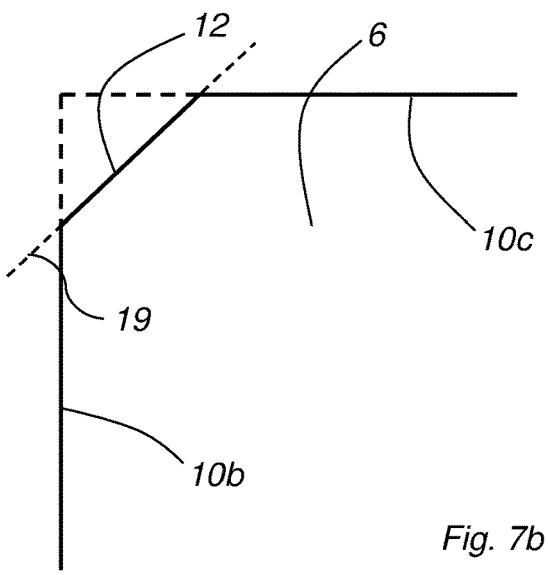
Fig. 7b
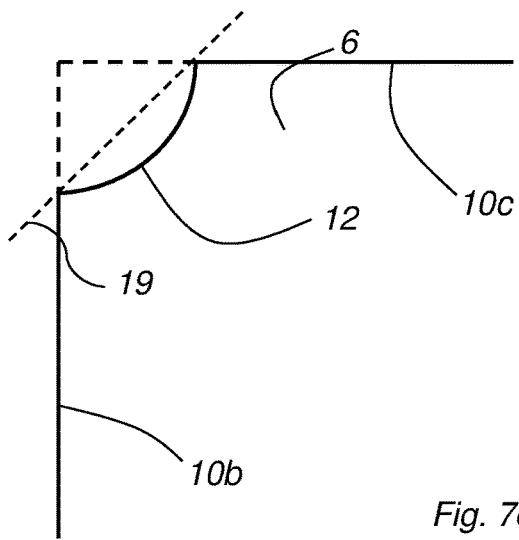
Fig. 7c
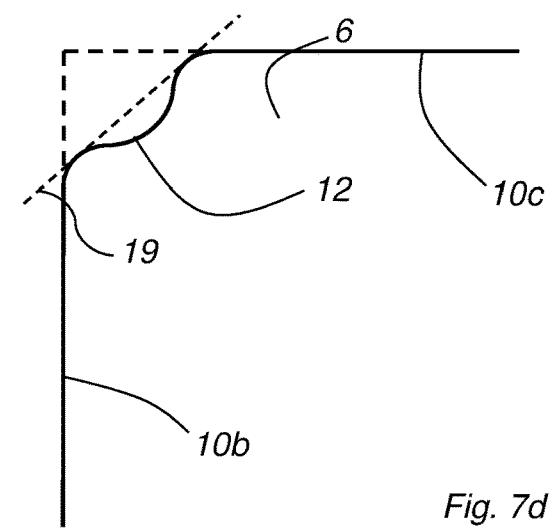
Fig. 7d
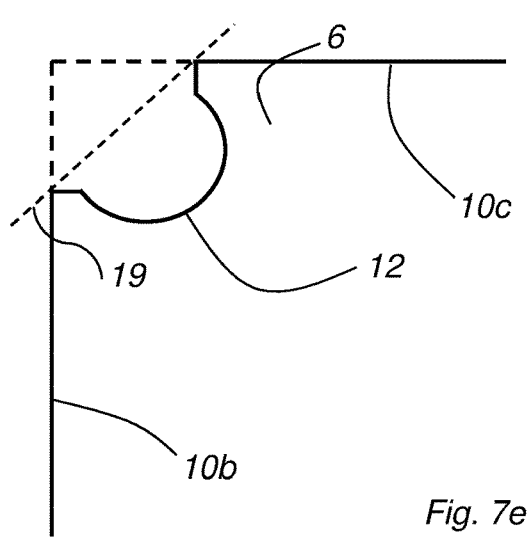
Fig. 7e
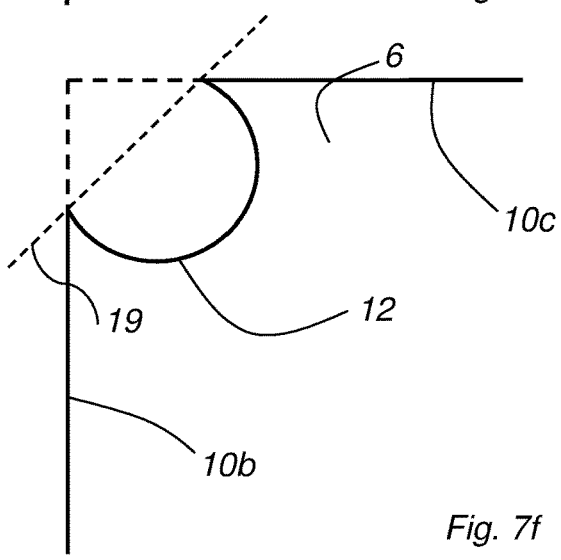
Fig. 7f

MEMBRANE STACK AND METHOD FOR MAKING THE SAME

RELATED APPLICATIONS

This application is a National Stage Application under 35 U.S.C. 371 of co-pending PCT application PCT/GB2016/053584 designating the United States and filed Nov. 17, 2016; which claims the benefit of GB application number 1520869.7 and filed Nov. 26, 2015 each of which are hereby incorporated by reference in their entireties.

FIELD OF THE INVENTION

The present invention relates to a membrane stack, such as a stacked arrangement of planar membrane cells. In a further aspect the present invention relates to a method of manufacturing a membrane stack.

PRIOR ART

International application WO 2012/065016 discloses an electrical purification apparatus comprising a cell stack having a first compartment comprising a first cation exchange membrane and a first anion exchange membrane, the first compartment constructed and arranged to provide a direct fluid flow in a first direction between the first cation exchange membrane and the first anion exchange membrane. A second compartment is provided comprising the first anion exchange membrane and a second cation exchange membrane to provide a direct fluid flow in a second direction between the first anion exchange membrane and the second cation exchange membrane, each of the first compartment and the second compartment constructed and arranged to provide a fluid contact of greater than 85% of the surface area of the first cation exchange membrane, the first anion exchange membrane, and the second cation exchange membrane. The cell stacks used in WO 2012/065016 do not comprise corner recesses. Furthermore, WO 2012/065016 uses large pools of the adhesive to affix the cell stacks to the housing.

UK patent publication GB-A-1 292 952 discloses a membrane pack construction for use in electrodialysis, dialysis or reverse osmosis. A stack of membranes with membranes, separators, and sealing pieces are positioned inside a box. Blocks of material are added to ensure that spaces are left for inlet/outlet manifolds, and sealing material is poured in the space between the wall of the block and the side of the cells.

SUMMARY OF THE INVENTION

The present invention seeks to provide an improved membrane stack, such as a stacked arrangement of planar membrane cells inside a housing, which stack has a large membrane area per unit of volume of the housing. Furthermore, the present invention seeks to provide a cost-effective method for producing such membrane stacks.

According to the present invention there is provided a membrane cell stack arrangement, comprising:
a housing (2) having a central axis and an inner surface (2a), a stack of membrane cells (4), each membrane cell (6) being arranged inside the housing (2) with a major surface (6a) of the membrane cell (6) oriented substantially perpendicular to the central axis, each membrane cell (6) having a shape with at least four sides (10a, 10b, 10c, 10d), wherein at least one of the sides of the at least four sides provide a flow input to the membrane cell and at least one of the sides of the at least four sides (10a, 10b, 10c, 10d) provide a flow output from the membrane cell and the other sides of the at least four sides (10a, 10b, 10c, 10d) provide closed side walls of the membrane cell, wherein each membrane cell (6) comprises a corner recess (12) between each two adjacent sides of the at least four sides (10a, 10b, 10c, 10d), and the membrane cell stack arrangement (1) further comprises sealing compartments (14) which are substantially parallel to the central axis of the housing (2), each sealing compartment (14) being provided by a corner recess (12) of adjacent membrane cells (6) of the stack of membrane cells (4) in co-operation with a part of the inner surface (2a) of the housing (2).

Each membrane cell is arranged inside the housing with a major surface of the membrane cell oriented substantially perpendicular to the central axis, preferably with a deviation not larger than 5°, e.g. the angle between the major surface of the membrane cell and the central axis is between 85° and 95°, more preferably between 87° and 93°.

The recess and recesses referred to in this invention may alternatively be referred to as recession and recessions respectively.

Each membrane cell is typically a fluid flow compartment delimited by a lower membrane, an upper membrane and at least two closed side walls and optionally comprises a fluid permeable spacer in between the two membranes. Typically each membrane cell has two open sides through which fluid may flow and the other sides are closed side walls. Typically adjacent membrane cells share a membrane.

The membrane cells comprising a corner recess between each two adjacent sides of the at least four sides are typically membrane cells in which the corner parts have been removed. For example, the membrane cells comprise lower and upper membranes the corner parts of which have been removed, along with the corner parts of any fluid-permeable spacer present between the lower and upper membranes. The corner parts of the lower and upper membranes (and of the fluid-permeable spacer, when present) may be removed by, for example, laser-cutting, die-cutting or waterjet cutting. The corner recesses may be formed prior to formation of the membrane stack or, if desired, after the membrane stack has been formed.

The housing is preferably a tubular housing comprising a circumferential wall and two open ends or two closed ends, comprising one or more fluid inlets and one or more fluid outlets.

The stack of membrane cells can be easily put together inside the housing, and the corner recesses together with a wall of the housing provide for a properly defined space for sealing material. As a result, the surface area part of the housing cross-section available for each membrane cell inside the housing is larger than prior art arrangements, i.e. a larger membrane cell area fits into the housing than in prior art arrangements.

In a second aspect the present invention relates to a method of manufacturing a membrane cell stack arrangement, comprising the steps of:
providing a housing having a central axis and an inner surface;
building a stack of membrane cells,
each membrane cell having a shape with at least four sides, wherein at least one of the sides of the at least four sides provide a flow input to the membrane cell and at least one of the sides of the at least four sides provide a flow output from the membrane cell and the other sides of the at least four sides provide closed side walls of the membrane cell, wherein each membrane cell comprises a corner recess between each two adjacent sides of the at least four sides, and positioning the stack of membrane cells in the housing, wherein a major surface of each membrane cell is oriented substantially perpendicular to the central axis of the housing, thereby providing sealing compartments extending substantially parallel to the central axis, each sealing compartment being formed by corner recesses of adjacent membrane cells of the stack of membrane cells in co-operation with a part of the inner surface of the housing, and an input compartment and an output compartment, each extending substantially parallel to the central axis of the housing, the input compartment and output compartment being formed by the flow inputs and flow outputs, respectively, of adjacent membrane cells of the stack of membrane cells in co-operation with a further part of the inner surface of the housing.

The second aspect of the present invention provides a cost-effective and simple method for manufacturing membrane cell stack arrangements.

SHORT DESCRIPTION OF DRAWINGS

The present invention will be discussed in more detail below, using a number of exemplary embodiments, with reference to the attached drawings, in which FIG. 1 depicts a three dimensional view of an embodiment of a membrane cell stack arrangement according to the present invention;

FIGS. 2 to 4 depict schematic top views of various embodiments of a membrane cell stack arrangement according to the present invention;

FIG. 5 depicts a schematic top view of a further embodiment of a membrane cell stack according to the present invention;

FIG. 6 depicts a schematic top view of an even further embodiment of a membrane cell stack according to the present invention; and FIGS. 7a to 7f depict schematic top views of corner recesses according to the present invention.

DETAILED DESCRIPTION OF EXEMPLARY EMBODIMENTS

Figure 1:
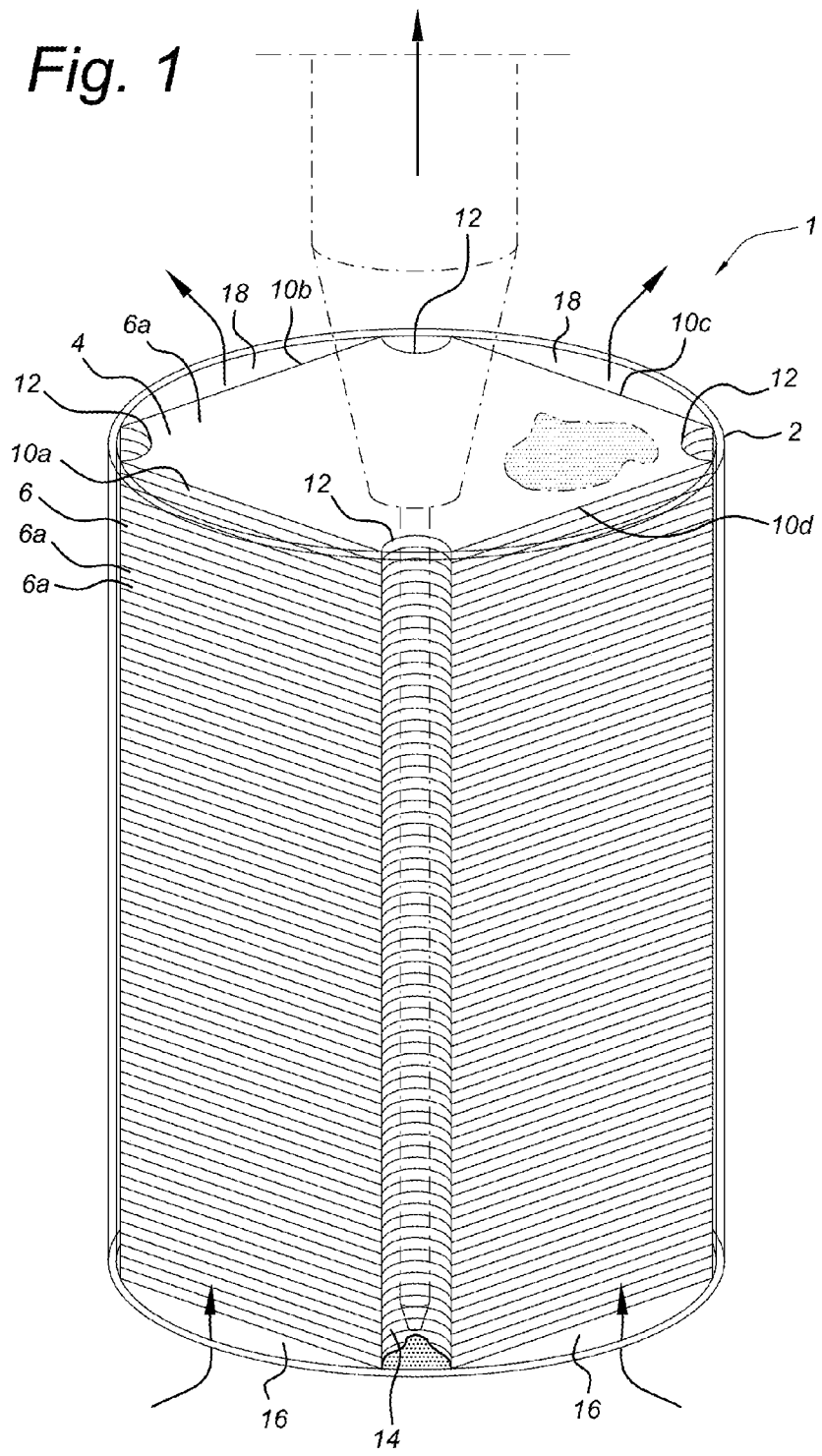

FIGS. 1 and 2 depict a three-dimensional view and a top view, respectively, of an embodiment of a membrane cell stack arrangement 1 according to the present invention. For convenience and clarity the embodiment of FIG. 2 may be regarded as a top view or cross-sectional view of the embodiment shown in FIG. 1.

As depicted, the membrane cell stack arrangement 1 comprises a housing 2 encircling or surrounding a stacked arrangement of membrane cells 4, wherein the housing 2 comprises a central axis or longitudinal axis (not shown) and a wall surrounding that central axis (having an inner surface 2a). In an embodiment the housing 2 may be a tubular housing 2, meaning an elongate body having a central bore extending there through (i.e. having two open ends). The elongated body does not need to be cylindrical as depicted in FIG. 1, but may have a different cross-sectional shape, for example hexagonal as depicted in FIG. 4. However cylindrical housings are preferred. In a typical embodiment, the (tubular) housing 2 may comprise or be constructed from low density polyethylene, high density polyethylene, polypropylene, polyvinyl chloride, polycarbonate, polymethyl methacrylate, acrylonitrile butadiene styrene, polyetheretherketone, epoxy resin, or a combination or blend of two or more thereof. The housing 2 may further comprise a strengthening material, for example metal, glass fiber, carbon fiber, aramid fiber, or a combination comprising two or more thereof.

For ease of reference and generality, the terms "membrane stack", "stack of membrane cells", and "stacked arrangement of membrane cells" are considered synonyms and will be used interchangeably throughout the present disclosure.

Each membrane cell 6 of the stack of membrane cells 4 is arranged inside the housing 2 with a major surface 6a of the membrane cell 6 oriented substantially perpendicular to the central axis. The stacked arrangement of membrane cells 4 may comprise planar membrane cells 6, e.g. substantially flat membrane cells. The stack of membrane cells 4 may comprise membrane cells 6 comprising a cation exchange membrane and/or an anion exchange membrane and/or another type of membrane such as a bipolar membrane. Preferably each membrane cell 6 comprises a cation and/or an anion exchange membrane. In an embodiment each membrane cell 6 comprises a cation and an anion exchange membrane. Typically one or both of the ion exchange membranes present in each membrane cell 6 also act as an ion exchange membrane for the adjacent membrane cells 6 in the stack. Thus the membrane stack arrangement preferably comprises alternate cation exchange membranes and anion exchange membranes throughout the membrane cell stack arrangement 1.

The anion exchange membranes and cation exchange membranes, also collectively referred to as ion exchange membranes, may have a smooth surface or may have a profiled surface. One or both surfaces of the ion exchange membrane may have profiles in the form of ribs and/or protrusions varying in height between, for example, 5 and 800 μm, depending on the desired function. Protrusions of a low height may enhance the turbulence of the fluid flowing near the membrane surface through the membrane cell 6. Higher protrusions may contribute to keeping the membranes of a membrane cell 6 apart thereby making spacers superfluous. Examples of suitable protrusions include circular cones, multi-angular pyramids (e.g. triangular pyramidal, square pyramidal and hexagonal pyramidal), hemispheres, mesas (e.g. square, triangular and circular mesas), domes, circular truncated cones, truncated pyramids, diamonds, short ridges, and combinations of two or more of the foregoing. Preferred are protrusions which have an average length (L) to average width (W) ratio of 10:1 to 1:10, more preferably 7:1 to 1:7, especially 5:1 to 1:5, more especially 2.5:1 to 1:2.5, when measured at the base of the protrusion. These preferences arise because better convection and lower blockage problems can often be obtained with the aforementioned L to W ratios than when continuous ribs are used where a particle may completely block the passage of liquid between two ribs. Preferably the profiled surface comprises protrusions at least 80% (preferably 100%) of which have a maximum dimension in all directions (length, width and height) of less than 20 mm. Preferably the profiled surface comprises protrusions which have a maximum dimension in all directions (length, width and height) of 0.04 to 10 mm, more preferably 0.05 to 6 mm. Preferably the profiled surface comprises protrusions which are separated from each other by an average of at least 0.1 mm, more preferably at least 0.5 mm, e.g. by 1, 2, 4, 8 or 12 mm.

Each membrane cell 6 of the stack of membrane cells 4 may comprise a shape, circumference or periphery with at least four (preferably straight) sides (10a, 10b, 10c, 10d), wherein at least two sides (preferably two sides) of the at least four straight sides provide a flow input and a flow output to the membrane cell 6 and the other ones (sides) of the at least four straight sides provide closed side walls of the membrane cell 6. Put another way, each membrane cell 6 preferably has a shape with at least four sides (10a, 10b, 10c, 10d), wherein at least one (preferably only one) of the sides of the at least four sides provide a flow input to the membrane cell 6 and at least one (preferably only one) of the sides of the at least four sides provide a flow output from the membrane cell 6 and the other sides of the at least four sides provide closed side walls of the membrane cell 6.

The stack of membrane cells 4 may be arranged in a cross flow stack pattern to optimize the efficiency of the stack of membrane cells 4. In such an embodiment, the direction of flow from flow input to flow output of adjacent membrane cells 6 are at an angle to each other (90 degrees in the embodiment shown in FIG. 1, 60 degrees in the embodiment shown in FIG. 4). Preferably adjacent membranes are affixed to each other along the other sides of the at least four sides by means of a sealing material, e.g. an adhesive, or by welding, providing closed side walls of the membrane cell 6.

Each membrane cell 6 comprises a corner recess 12 between each two adjacent ones (sides) of the at least four sides 10a-d. The membrane cell stack arrangement 1 further comprises sealing compartments 14 in general substantially parallel to the central axis of the housing 2, wherein each sealing compartment 14 is provided by corner recesses 12 of adjacent membrane cells 6 of the stack of membrane cells 4 in co-operation with a part of the inner surface 2a of the housing 2.

The membrane cell stack arrangement 1 of the present invention, in particular the corner recesses 12 of each membrane cell 6, allows for a larger surface area of each membrane cell 6 in the housing 2 in relation to the cross-section (perpendicular to the central axis) of the housing 2, thereby increasing overall efficiency of the membrane cell stack arrangement 1. Furthermore, the corner recesses 12 of each membrane cell 6 in conjunction with the inner surface 2a of the housing 2 provide a sealing compartment 14 for affixing each membrane cell 6 to the housing 2 as well as providing a seal between each two adjacent sides of the at least four sides 10a-d of each membrane cell 6.

In a preferred embodiment, the sealing compartments 14 comprise a sealing material. The sealing material allows for both an improved connection of each membrane cell 6 to the housing 2 as well as an improved seal between each two adjacent sides of the at least four sides 10a-d of each membrane cell 6. Preferably at least 50%, more preferably at least 70%, especially at least 80% of the sealing material used to affix the stack of membrane cells 4 to the housing 2 is located within the sealing compartments 14. Preferably the sealing material present in each of the sealing compartments 14 extends outside of each side of each sealing compartment 14 to a distance of less than 70%, more preferably less than 60%, especially less than 50%, more especially less than 40% of the width of the sealing compartment 14. In this way, the cost of the membrane cell stack arrangement 1 is reduced (due to lower material costs) and the throughput, speed and efficiency of the membrane cell stack arrangement 1 are increased (due to sealing material being largely contained within the sealing compartment 14 and thereby not impeding fluid flow through the membrane cell stack arrangement 1).

In an embodiment, the membrane cell stack arrangement 1 may further comprise an input compartment 16 and an output compartment 18, each extending substantially parallel to the central axis of the housing 2 (e.g. within +/−5 degrees of parallel), the input compartment 16 and output compartment 18 being in fluid communication with the flow inputs and flow outputs, respectively, of adjacent membrane cells 6 of the stack of membrane cells 4 in co-operation with a further part of the inner surface 2a of the housing 2.

So in this embodiment each flow input in conjunction with a part of the inner surface 2a of the housing 2 delimits a manifold such as the input compartment 16. Each flow output in conjunction with a part of the inner surface 2a of the housing 2 then delimits a manifold such as the output compartment 18. Consequently, the input compartment 16 collectively connects each flow input to a main input of the membrane cell stack arrangement 1 and the output compartment 18 collectively connects each flow output to a main output of said stack arrangement 1.

In an advantageous embodiment, the sealing material may be a cured material, for example a cured resin, which completely fills the sealing compartment 14 before curing and which firmly affixes each membrane cell 6 to the housing 2 when cured.

In an embodiment, the sealing material has a viscosity (when measured at 25° C. and a shear rate of 1 s$^{-1}$) of at least 25 Pa·s, preferably at least 50 Pa·s, before curing. In this way one may ensure that the sealing compartment 14 is sufficiently filled with a sealing material without sealing material leaking towards the input compartments 16 and output compartments 18, and a seal may be obtained between each two adjacent sides of the at least four straight sides 10a-d of each membrane cell 6. Viscosity may be measured using a Physica MCR301 rheology meter from Anton Paar GmbH. A suitable method of determining the viscosity is as follows: System: PP20-5N19266; [d=0.3 mm]. Density was set at 1. Temperature was 25° C. Start shear rate was 1 s$^{-1}$ during 70 s, followed by a shear rate of 100 s$^{-1}$ during 50 s and subsequently a shear rate of 1 s$^{-1}$ during 11 s. Preferably the viscosity value is the average of an independent duplo measurement and of each measurement the average of the last 10 s. The viscosity of the sealing material is preferably less than 1 MPa·s, more preferably less than 100,000 Pa·s (when measured at 25° C. and a shear rate of 1 s$^{-1}$, as described above).

Preferably the sealing material has a high degree of elasticity. The degree of elasticity can be expressed as the elongation at break, also referred to as engineering tensile strength, and can be measured by a tensile testing machine. In an embodiment, when cured, the sealing material has a Shore A hardness of less than 90, preferably less than 70, and an elongation at break of at least 50%, preferably of at least 100%. This enables the sealing material to accommodate dimensional variations of the stack of membrane cells 4, e.g. due to swelling or flow pressure fluctuations. Preferably the (cured) sealing material has a Shore A hardness of at least 10 and an elongation at break of no more than 2,000%. Shore A hardness may be measured using a durometer in accordance with ISO 868. Elongation at break may be measured by the method of ISO 37 (i.e. on a sample of the sealing material when cured in isolation). The tensile strength of the sealing material is often not crucial because the stack of membrane cells 4 is fixed inside the housing 2. Preferably, however, the sealing material has a tensile strength >0.4

N/mm², more preferably >0.5 N/mm². The tensile strength of the sealing material may be measured by the method of ISO 37.

Preferably the sealing material is a cured silicone adhesive. This is because silicone adhesives are often soft when cured and have a long elongation at break. Examples of suitable silicone adhesives include Ottocoll silicone adhesives from from Otto Chemie (e.g. Ottocoll® S610 and S640, two-part alkoxy silicones); Sikasil® silicone sealants (e.g. Sikasil® SG-18, SG-20, SG-500, SG-500 CN, SG-550, GS-621, IG-25, IG-25 HM Plus, WS-305 CN, WS-355, WS-605 S FS-665 and FS-665 SL); Sikaflex® and Sikabond® silicone adhesives from Sika®; Mastersil® silicone adhesives from Masterbond; silicone adhesive sealant from Permatex.

Further adhesives which may be cured to provide the sealing material include polyurethane adhesives, e.g. Powerline and Marine adhesives from 3M™; Desmoseal®S adhesives from Bayer; and hybrid adhesives such as Geniosil® adhesives from Wacker Chemie and Hybrid Adhesives from 3M™. An example of an epoxy-containing adhesive having a Shore A hardness of less than 90 and an elongation at break of more than 50% is Duralco™ 4538N, preferably with a hardener/resin ratio of at least about 2:1. Duralco™ 4538N may be obtained from Cotronics Corp.

The sealing material optionally contains one or more further components, for example a strengthening material or beads. The optional beads can be made of any suitable material, for example glass, silica, polymethylmethacrylate (PMMA), crosslinked polymethylmethacrylate ethylene dimethacrylate, polystyrene and crosslinked polystyrene divinylbenzene. The optimal amount of beads is from 0.5 wt % and 50 wt %, relative to the weight of the sealing material.

In an embodiment, the ratio of the volume of the input compartment 16 to the volume of the sealing compartment 14 is between 2 and 2,000, preferably between 3 and 1,400, more preferably between 30 and 1,000, depending on the inner diameter of the housing 2, thereby providing sufficient capacity for the input flow to the entire stack, as well as sufficient capacity for the sealing compartment 14 to form a proper internal sealing of the membrane cell stack arrangement 1. Similarly, the ratio of the volume of the output compartment 18 to the volume of the sealing compartment 14 is preferably between 2 and 2,000, preferably between 3 and 1,400, more preferably between 30 and 1,000, depending on the inner diameter of the housing 2.

Figure 7G:
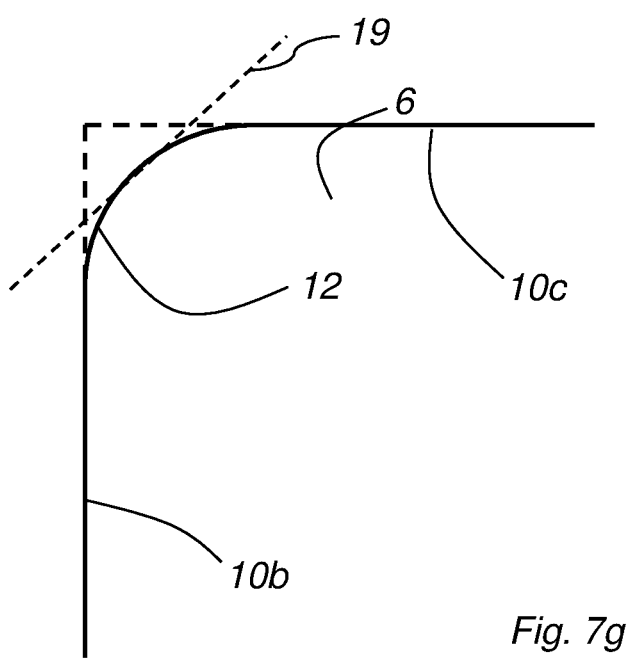
FIG. 7g is comparative and depicts a schematic top view of a corner which does not comprise a recess and instead has an outwardly-rounded or convex shape.

Referring to FIG. 2, in an advantageous embodiment the corner recess 12 comprises a (inwardly) curvilinear shape, e.g. (inwardly) semicircular, straight cut or polygonal shape or a combination of two or more thereof. Thus the corner recess 12 is preferably flat or inwardly curved/concave. Examples of corner recesses 12 are depicted schematically in FIG. 7a-7f Preferred are corner recesses 12 the tangent 19 to which has at least two points of contact (more preferably two and only two points of contact) with the membrane cell 6. For membrane cells having four sides preferably the tangent 19 to one or more, preferably all of the corner recesses 12 of each membrane cell 6 are at an angle of about 45 degrees (e.g. (40 to 50 degrees) relative to the sides adjacent each recess 12, as illustrated in FIG. 7b. Thus a recess may be provided by cutting a straight edge from a corner of a membrane cell 6 or by removing an inwardly curved portion from a corner of the membrane cell 6. An outwardly curved (convex) corner (such as that depicted in FIG. 7g) the tangent 19 to which has only one point of contact is not a recess because it points outwards. For a membrane cell 6 having six sides, the tangents 19 to preferably one or more, preferably all of the corner recesses 12 of each membrane cell 6 are at an angle of about 30 degrees (e.g. (25 to 35 degrees) relative to the sides adjacent each recess 12. For a membrane cell 6 having eight sides, the tangents 19 to preferably one or more, preferably all of the corner recesses 12 of each membrane cell 6 are at an angle of about 22.5 degrees (e.g. (20 to 25 degrees) relative to the sides adjacent each recess 12.

The membrane cell 6 preferably has the same number of corner recesses 12 as sides. For example, when the membrane cell has four sides it preferably has four corner recesses, when the membrane cell has six sides it preferably has six corner recesses and when the membrane cell has eight sides it preferably has eight corner recesses. Preferably the membrane cell has an even number of sides.

The corner recess(es) 12 enable increased flexibility for a desired or required "shape factor" of the stack of membrane cells 4 in relation to the housing 2 for optimizing efficiency of the membrane cell stack arrangement 1.

In view of the above mentioned "shape factor", in further embodiments the housing 2 may comprise a circular cross-section or elliptical cross-section perpendicular to the central axis. However, in even further embodiments it is possible that the housing 2 may also comprise a rectangular cross-section, a polygonal cross-section and the like, e.g. hexagonal, octagonal, perpendicular to the central axis, so that the membrane cell stack arrangement 1 can be designed in order to meet virtually any shape requirement for a particular application.

For example, FIGS. 3 and 4 each show a schematic top view of an exemplary embodiment of an elliptical and a polygonal cross-section, respectively, of a membrane cell stack arrangement 1 according to the present invention. Based on a particular cross-section chosen, the corner recess 12 can be adapted to have a shape that provides optimal bonding of the stack of membrane cells 4 to the housing 2 as well as optimal sealing between each of two adjacent sides of the at least four straight sides 10a-d of each membrane cell 6.

FIG. 4 shows a schematic top view of another embodiment of the membrane cell stack arrangement 1 according to the present invention. In the embodiment shown each membrane cell 6 has six straight sides (10a, 10b, 10c, 10d, 10e, 10f), e.g. each membrane cell 6 has a hexagon-like cross-section as depicted. The housing 2 in FIG. 4 has a hexagon-like cross-section, but also a housing having a circular or oval cross-section can be chosen for membrane cells having a hexagon-like cross-section. In even a further embodiment, each membrane cell 6 may have eight sides, e.g. having an octagon-like cross-section. The corresponding housing 2 may also have an octagon-like cross-section or may have another cross-section, e.g. a circular cross-section.

In light of the present invention, the corner recess 12 can be suitably chosen based on the cross-sectional shape of the housing 2 and the stack of membrane cells 4 encircled thereby. Note that the embodiment shown in FIGS. 2, 3 and 4 are just examples of particular cross-sections of the stack of membrane cells 4 in relation to the housing 2. In any case, the corner recess 12 can be adapted to have a desired curvilinear/concave shape to provide an optimal bonding of each membrane cell 6 to the housing 2 as well as optimal sealing characteristic of each sealing compartment 14.

In an embodiment, the sides of the membrane cell 6 are not parallel to the inner surface 2a of the housing 2. This embodiment ensures that any input compartment 16 and output compartment 18 as described above are well defined and provide sufficient intake and discharge capacity for the membrane cell stack arrangement 1.

In an embodiment, the ratio of the projected area in the elongate direction (along the central axis) of the stack of membrane cells 4 and the projected area of the inner surface 2a of the housing 2 is at least 0.64, preferably at least 0.66, more preferably at least 0.67. FIGS. 2, 3 and 4 show projections along the central axis of several embodiments of the stack of membrane cells 4.

The inner diameter of the housing 2 and the maximum diameter of the stack of membrane cells 4 (substantially perpendicular to the central axis) are preferably about the same, i.e. provide a tight fit. The difference between the inner diameter of the housing 2 and the maximum diameter of the stack of membrane cells 4 is preferably between 5 and 8,000 μm, more preferably between 200 and 4,000 μm, e.g. a difference of about 1,000 or about 2,000 μm.

FIG. 5 shows a schematic top view of a further embodiment of a membrane cell 6 according to the present invention. In the embodiment shown, the membrane cell 6 may be provided with one or more through-holes 20, which allow a sealing material to be received therein. In particular, in an advantageous embodiment the stack of membrane cells 4 may comprise one or more of membrane cells 6, wherein each through-hole 20 aligns with one or more through hole 20 of an adjoining membrane cell 6 in the stack of membrane cells 4. As a result, when aligned, the one or more through-holes 20 of each membrane cell 6 provide throughholes extending through the entire stack of membrane cells 4. The one or more through-holes 20 can be filled with a curable sealing material to firmly affix the membrane cells 6 to each other once the sealing material is cured. When cured the sealing material in holes 20 forms a kind of internal frame and provides stability to the stack 4 during handling and positioning of the stack 4 inside the housing 2. Among handling activities are e.g. cutting of the sides to a desired size and to remove surplus sealing material used to affix membranes to each other. Through hole 20 preferably has a diameter of between 2 and 10 mm, more preferably of between 3 and 6 mm. Preferably the through-holes 20 are filled with sealing material, e.g. an adhesive, simultaneously with applying sealing material to the membrane during the making of the stack of membrane cells 4. In an embodiment when building the stack of membrane cells 4 temporary guiding bars are used at the position of the corner recesses 12 to assist in aligning membranes and spacers when present. Cutting of the (preferably straight) sides may be done by, for example, water jet or by laser beam wherein water jet cutting is preferred. In a preferred embodiment throughholes 20 are open to the corner recesses 12 and when cured the sealing material filling the through-holes 20 is in contact with the sealing material filling the sealing compartments 14. In the embodiment of FIG. 5 after building the stack the outer edge along the at least four straight sides 10a-d is cut off so that semi-circularly shaped corner recesses remain.

In an embodiment, the sealing material used to fill the one or more through-holes 20 may have a viscosity (at 25° C. and a shear rate of 1 s$^{-1}$) of at least 25 Pa·s before curing, preferably at least 50 Pa·s, to ensure that the one or more through holes 20 can be sufficiently filled with the sealing material for firmly positioning the membranes of one or more membrane cells 6 relative to each other and providing a flexible internal frame as part of the stack of membrane cells 4. The sealing material used for affixing membranes to each other, to fill through-hole 20 and to fill the sealing compartments 14 may be the same material or different materials may be used.

FIG. 6 shows a schematic top view of an even further embodiment of a membrane cell 6 which may be used in the membrane cell stack arrangements of the present invention. Each membrane cell 6 has a corner recess 12 between each two adjacent sides of its four straight sides, wherein the corner recess 12 has two perpendicularly oriented sides with a recess width d, thus forming a sealing compartment 14 between an inner surface 2a of the housing 2 and the two perpendicularly oriented sides of the recess 12. The housing 2 has an inner diameter D. Also indicated in this embodiment are the input compartments 16 and output compartments 18.

In Table 1 below, indicative values for several configurations of the membrane cell stack arrangement 1 according to the FIG. 6 embodiment of the present invention are given for the ratio of the projected surface area of the stack of membrane cells 4 and of the inner surface area of the housing 2 projected along the central axis (for a cylindrically shaped housing as depicted in FIG. 6 the projected surface area along the central axis can be calculated by the formula $\pi D^2/4$ wherein D is the inner diameter of the housing 2). As reference the ratio is calculated for an arrangement having no corner recesses. Also the ratio of the volume of the inlet and outlet compartments 16, 18 and of the sealing compartments 14 is included in Table 1.

TABLE 1

| Nr. | Housing inner diameter (D) | Corner recess width (d) | Ratio of projected surface area stack/inner surface area of the housing | Ratio of volume inlet or outlet compartment/sealing compartment |
|---|---|---|---|---|
| 1 | 100 | 7 | 0.744 | 20 |
| 2 | 100 | 15 | 0.821 | 2 |
| 3 | 280 | 12 | 0.707 | 62 |
| 4 | 280 | 20 | 0.746 | 19 |
| 5 | 280 | 25 | 0.767 | 11 |
| 6 | 700 | 15 | 0.673 | 278 |
| 7 | 700 | 20 | 0.685 | 151 |
| 8 | 700 | 30 | 0.707 | 62 |
| 9 | 1500 | 15 | 0.654 | 1357 |
| 10 | 1500 | 25 | 0.666 | 472 |
| 11 | 1500 | 30 | 0.671 | 322 |
| Ref. | 100-1500 | 0 | 0.637 | — |

The membrane cell stack arrangement 1 and various embodiments thereof as disclosed above may be advantageously used in e.g. an electrodialysis (ED) device or a reverse electrodialysis (RED) device. The electrodialysis device may be a filled cell electrodialysis device also known as an electrodeionization device. Such a device may comprise a stack of 2 to 1200 membrane cells, preferably 20 to 600 membrane cells, depending on the desired application.

The stack of membrane cells 4 may further comprise an electrode cell at each end of the stack, which may also serve as end plates. Alternatively separate end plates are provided that seal off the housing 2 at both ends. The electrode cells may comprise an electrolyte solution different from or identical to the fluid fed into the other membrane cells 6. Examples of electrolytes that may be used in the electrode cells are sodium chloride, potassium chloride, sodium sulfate, Fe(II) and Fe(III) salts, such as $FeCl_2$, $FeCl_3$, $FeSO_4$, $Fe_2(SO_4)_3$, or combinations thereof.

The end plates typically provide connections to the flow input compartments 16 and the flow output compartments 18 of the stack of membrane cells 4.

The stack of membrane cells 4 may further comprise membrane cells 6 having two ion exchange membranes, e.g.

an anion exchange membrane and a cation exchange membrane, kept apart by a fluid permeable spacer. The fluid permeable spacer is preferably made of an inert, electrically insulating material. Suitable inert, electrically insulating materials include polyethylene, polypropylene, polyamide, polyethylene terephthalate, polyimide, polytetrafluorethylene, polyvinylidene fluoride, fiberglass and polyvinylchloride. Optionally the fluid-permeable spacer is coated with an ion-conducting layer to enhance ion transport and to reduce spacer shadow effects. Examples of commercially available materials which may be used as the fluid-permeable spacer include extruded netting from Delstar (e.g. N01014_60PP_NAT, N1014_90PP-NAT and N01017_90PP-NAT), from Industrial Netting (e.g. XN-4820), and woven material from Sefar (e.g. NITEX 06-475/56, NITEX 03-300/51, NITEX 06-390/47, NITEX 07-240/59 and NYTAL PA 06-212). The fluid-permeable spacer preferably comprises a woven or non-woven netting (or mesh), preferably having a thickness of 100 to 1000 µm, more preferably 150 to 800 µm. The orientation of the strands of the netting is preferably about 45° with respect to the main flow direction of fluid through the membrane cell 6. The size of the openings in the netting is preferably between 70 and 500 µm, more preferably between 100 and 400 µm.

The electrode in the electrode cell preferably comprises a suitable conductive material, such as, for example, stainless steel, graphite, titanium, platinum, iridium, rhodium, niobium, zirconium, tantalum, tungsten, conductive polymers, conductive oxides, conductive polymer/carbon composites, or a combination of two or more thereof. For example the electrode may be a titanium mesh, a stainless steel mesh, a polyolefin/graphite composite film, a graphite plate, or a titanium plate. In addition, the electrode may be uncoated or coated. Examples are a platinum coated stainless steel mesh and an iridium oxide coated titanium mesh. In certain embodiments, one or more conducting polymers may be employed as the electrode. Non-limiting examples of such conducting polymers may include polyaniline, polypyrrole, polythiophene, and combinations thereof. The electrode may comprise a mixed metal oxide. Examples of conductive oxides may comprise indium-doped tin oxide (ITO), antimony-doped tin oxide (ATO), and aluminium-doped zinc oxide. In one embodiment, the electrode may comprise a conductive high surface layer that may be formed of any conductive materials or composites with a high surface area. Examples of such materials for the conductive high-surface-layer include active carbon, carbon nanotubes, graphite, carbon fiber, carbon cloth, carbon aerogel, metallic powders, for example nickel, metal oxides, for example ruthenium oxide, conductive polymers, and any mixtures of any two or more of the above.

In a further aspect, the present invention relates to a method for manufacturing a membrane cell stack arrangement. Reference is made to the FIGS. 1-7 for clarity and convenience.

According to the present invention, the method comprises the steps of providing a housing 2 having a central axis and an inner surface 2a, building a stack of membrane cells 4, wherein each membrane cell 6 has a shape with at least four sides 10a-d, wherein at least one (preferably only one) of the sides of the at least four sides 10a-d provide a flow input to the membrane cell and at least one (preferably only one) of the sides of the at least four sides 10a-d provide a flow output from the membrane cell 6 and the other ones (sides) of the at least four sides provide closed side walls of the membrane cell 6, wherein each membrane cell 6 comprises a corner recess 12 between each two adjacent ones (sides) of the at least four sides 10a-d. The method further comprises positioning the stack of membrane cells 4 in the housing 2, wherein a major surface 6a of each membrane cell 6 is oriented substantially perpendicular to the central axis of the housing 2, thereby providing sealing compartments 14 extending substantially parallel to the central axis. In short, the stack of membrane cells 4 may be seen as a parallel arrangement of planar membrane cells 6 coaxially disposed in the housing 2, wherein the corner recesses 12 provide sealing compartments 14 extending in longitudinal direction (i.e. parallel to the central axis) of the housing 2. The term 'longitudinal' is not intended to imply that the length of the housing 2 must be greater than its width.

The sealing compartments 14 are formed by corner recesses 12 of adjacent ones (i.e. membrane cells 6) of the stack of membrane cells 4 in co-operative engagement with a part of the inner surface 2a of the housing 2, and an input compartment 16 and an output compartment 18, each extending parallel to the central axis or in longitudinal direction of the housing 2. The input compartment 16 and output compartment 18 are formed by the flow inputs and flow outputs respectively, of adjacent ones of the stack of membrane cells 4 in co-operative engagement with a further part of the inner surface 2a of the housing 2.

The method of the present invention allows for a convenient, efficient and modular assembly of a membrane cell stack arrangement 1. Most notably, an advantage of the method is that while positioning one or more stacks of membrane cells 4 in the housing 2, the sealing compartments 14 are automatically obtained by virtue of the corner recesses 12 of each membrane cell 6 in conjunction with a part of the inner surface 2a of the housing 2. Furthermore, the at least four sides 10a-d, of each membrane cell 6 in conjunction with a part of the inner surface 2a of the housing 2 define or delimit the input compartments 16 and output compartments 18 of the membrane cell stack arrangement 1. This reduces the number of parts used as well as the number of parts to be handled when manufacturing the membrane cell stack arrangement 1.

The building of a stack of membrane cells 4 typically comprises the steps of providing a cation exchange membrane, applying a sealing material along the other sides of the at least four sides of the cation exchange membrane, optionally positioning a spacer on top of the cation exchange membrane, positioning an anion exchange membrane on top thereof, and applying a sealing material along the other sides of the at least four sides of the anion exchange membrane, wherein the orientation of the applied sealing material on the anion exchange membrane is different from the orientation of the applied sealing material on the cation exchange membrane. In an embodiment (part of the) cation exchange membranes are affixed to cation exchange membranes and/or (part of the) anion exchange membranes are affixed to anion exchange membranes and/or (some of the) cation or anion exchange membranes are affixed to other types of membranes such as bipolar membranes. While building the stack of membrane cells 4 compression may be applied after positioning of each membrane or after a number of membranes have been stacked. In one embodiment after a stack of membrane cells 4 has been built the stack of membrane cells 4 is compressed and the sealing material is cured while the stack of membrane cells 4 is kept under compression. Preferably the compression is applied such that the height of the stack of membrane cells 4 is brought to a predetermined value. Optionally guiding bars may be used to make it easier to align membranes and optional spacers during positioning.

In an embodiment, the method may further comprise the step of filling the sealing compartments 14 with a sealing material, e.g. a curable sealing material. In this embodiment the sealing compartments 14 may be filled with a sealing material to both affix each membrane cell 6 (i.e. the stack of membrane cells 4) to the housing 2 as well as providing a seal between two adjacent sides of a membrane cell 6 having disposed therebetween a corner recess 12 (i.e. providing a seal between the input compartments 16 and the output compartments 18).

To rigidly affix each membrane cell to the housing 2 and providing a seal, the method may further comprise curing the sealing material. In a typical embodiment the sealing material may be a cured material (e.g. cured resin), having e.g. a viscosity (at 25° C. and a shear rate of 1 $s^{-1}$) of at least 25 Pa·s before curing. This level of viscosity allows the curable material to easily flow into the sealing compartment 14 filling it completely without (excessive) leakage to other compartments. Curing of the sealing material may be achieved by radiation, e.g. by UV or visible light, by exposure to heat (or IR radiation), to humidity, by a chemical reaction, e.g. in a two component adhesive system, or by a combination of two or more of these methods.

Building a stack of membrane cells 4 need not be performed in a single manufacturing process with consecutively adding membrane cells 6 until all required membrane cells 6 have been stacked within the housing 2 or prior to placing the stack of membrane cells 4 inside the housing 2. Instead, it may be desirable to produce the stack of membrane cells 4 in a batch-wise fashion, thus by positioning a first stack of membrane cells 4 in the housing 2 followed by positioning a second stack of membrane cells 4 in the housing 2. Preferably stacks of membrane cells 4 are affixed to each other by a sealing material which may be the same as or different from the sealing material used to affix the stacks of membrane cells 4 to the housing 2. So in an embodiment the method may further comprise positioning a second stack of membrane cells 4 in the housing 2 on top of a first stack of membrane cells 4. This embodiment may be advantageous for larger stacks of membrane cells 4, where a first stack of membrane cells 4 is positioned and affixed to the housing 2 as outlined above before a second stack of membrane cells 4 is positioned and affixed to the housing 2. In light of this an embodiment is provided wherein the method further comprises filling the sealing compartments 14 associated with the second stack (and possibly further stacks) of membrane cells 4 with a sealing material. Alternatively, several stacks of membrane cells 4 are positioned in the housing 2 on top of each other after which all stacks are affixed to the housing 2 by filling the sealing compartments 14. As with all embodiments described above, the sealing material may be a cured material, e.g. a cured resin with suitable viscosity before curing.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A membrane cell stack arrangement, comprising:
a housing having a central axis, and a wall surrounding the central axis and having an inner surface,
a stack of membrane cells, each membrane cell being arranged inside the housing with a major surface of the membrane cell oriented substantially perpendicular to the central axis,
each membrane cell having a shape with at least four sides, wherein a first side of the at least four sides over its full width provides a flow input to the membrane cell and at least a second side of the at least four sides over its full width provides a flow output from the membrane cell and the other sides of the at least four sides provide closed side walls of the membrane cell, wherein
each membrane cell comprises a corner recess between each two adjacent sides of the at least four sides, and the membrane stack arrangement further comprises sealing compartments which are substantially parallel to the central axis of the housing, each sealing compartment being provided by a corner recess of adjacent membrane cells of the stack of membrane cells in co-operation with a part of the inner surface of the wall,
wherein the corner recesses together with the wall of the housing define a space for sealing material.

2. The membrane cell stack arrangement according to claim 1, wherein the said sides of the membrane cell are straight.

3. The membrane cell stack arrangement according to claim 1, which further comprises a sealing material present in the sealing compartment.

4. The membrane cell stack arrangement according to claim 1 wherein the corner recesses are flat or inwardly curved.

5. The membrane cell stack arrangement according to claim 1 wherein a tangent to the corner recesses has at least two points of contact with the membrane cell.

6. The membrane cell stack arrangement according to claim 1 which further comprises a sealing material and at least 50% of the sealing material used to affix the stack of membrane cells to the housing is located within the sealing compartments.

7. The membrane cell stack arrangement according to claim 1 which further comprises a sealing material present in each of the sealing compartments and said sealing material extends outside of each side of each sealing compartment to a distance of less than 70% of the width of the sealing compartment.

8. The membrane cell stack arrangement according to claim 1, wherein the stack of membrane cells further comprises at least one through-hole comprising a sealing material.

9. The membrane cell stack arrangement according to claim 1, wherein the sealing compartment comprises a sealing material and the sealing material has a viscosity before curing of at least 25 Pa·s, when measured at 25° C. and a shear rate of 1 $s^{-1}$.

10. The membrane cell stack arrangement according to claim 1, wherein the sealing compartment comprises a sealing material and the sealing material has a Shore A hardness of less than 90 and at least 10, when measured in accordance with ISO 868.

11. The membrane cell stack arrangement according to claim 1, wherein the sealing compartment comprises a sealing material and the sealing material has an elongation at break of at least 50% and no more than 2,000%, when measured by the method of ISO 37.

12. The membrane cell stack arrangement according to claim 1 which further comprises an input compartment and an output compartment, each extending substantially parallel to the central axis of the housing, the input compartment and output compartment being formed by the flow inputs and flow outputs, respectively, of adjacent membrane cells of the stack of membrane cells in co-operation with a further part of the inner surface of the housing.

13. The membrane cell stack arrangement according to claim 12, wherein the ratio of the volume of the input compartment to the volume of the sealing compartment is between 2 and 2,000.

14. The membrane cell stack arrangement according to claim 12, wherein a ratio of a volume of the output compartment and a volume of the sealing compartment is between 2 and 2000.

15. The membrane cell stack arrangement according to claim 1 wherein the ratio of the projected area along the central axis of the stack of membrane cells and the projected area of the inner surface of the housing is at least 0.64.

16. The membrane cell stack arrangement according to claim 1, wherein the housing has one of a circular cross-section; an elliptical cross-section; a rectangular cross-section; and a polygonal cross-section; in a direction perpendicular to the central axis.

17. The membrane cell stack arrangement according to claim 1, wherein the stack of membrane cells is arranged in a cross flow stack pattern.

18. The membrane cell stack arrangement according to claim 1, wherein each membrane cell has six sides.

19. The membrane cell stack arrangement according to claim 1, wherein each membrane cell has eight sides.

20. The membrane cell stack arrangement according to claim 1, wherein each membrane cell comprises an anion exchange membrane and/or a cation exchange membrane and/or a bipolar membrane.

21. The membrane cell stack arrangement according to claim 1, wherein the housing comprises low density polyethylene, high density polyethylene, polypropylene, polyvinyl chloride, polycarbonate, polymethyl methacrylate, acrylonitrile butadiene styrene, polyetheretherketone, epoxy resin, or a combination or blend thereof.

22. The membrane cell stack arrangement according to claim 1, wherein the sides of the membrane cell are not parallel to the inner surface of the housing.

23. A method of manufacturing a membrane cell stack arrangement, comprising the steps of:
providing a housing having a central axis, and a wall surrounding the central axis and having an inner surface;
building a stack of membrane cells,
each membrane cell having a shape with at least four sides, wherein at least a first side of the at least four sides over its full width provides a flow input to the membrane cell and at least a second side of the at least four sides over its full width provides a flow output from the membrane cell and the other sides of the at least four sides provide closed side walls of the membrane cell, wherein each membrane cell comprises a corner recess between each two adjacent sides of the at least four sides, and
positioning the stack of membrane cells in the housing, wherein a major surface of each membrane cell is oriented substantially perpendicular to the central axis of the housing, thereby providing sealing compartments extending substantially parallel to the central axis, each sealing compartment being formed by corner recesses of adjacent membrane cells of the stack of membrane cells in co-operation with a part of the inner surface of the housing, and
an input compartment and an output compartment, each extending substantially parallel to the central axis of the housing, the input compartment and output compartment being formed by the flow inputs and flow outputs, respectively, of adjacent membrane cells of the stack of membrane cells in co-operation with a further part of the inner surface of the wall;
the process further comprising the step of filling the sealing compartments with a curable sealing material and curing the curable sealing material,
wherein the corner recesses together with the wall of the housing define a space for sealing material.

24. The method according to claim 23, further comprising positioning a second stack of membrane cells in the housing on top of a first stack of membrane cells.

25. The method according to claim 24, further comprising filling the sealing compartments associated with the second stack of membrane cells with a curable sealing material.

26. An electrodialysis device or reverse electrodialysis device comprising the membrane cell stack arrangement according to claim 1.

* * * * *